UNITED STATES PATENT OFFICE.

CHRISTIAN HEINRICH RUDOLPH AND JULIUS HERBABNY, OF OFFENBACH-ON-THE-MAIN, GERMANY, ASSIGNORS TO THE FIRM OF K. OEHLER, OF SAME PLACE.

BLUE-RED TETRAZO DYE.

SPECIFICATION forming part of Letters Patent No. 594,123, dated November 23, 1897.

Application filed May 15, 1897. Serial No. 636,696. (Specimens.)

*To all whom it may concern:*

Be it known that we, CHRISTIAN HEINRICH RUDOLPH, doctor of philosophy, chemist, a subject of the King of Prussia, and JULIUS HERBABNY, doctor of philosophy, chemist, a subject of the Emperor of Austria-Hungary, residing at Offenbach-on-the-Main, Germany, have invented new and useful Improvements in and Relating to a Blue-Red Tetrazo Dye, of which the following is a specification.

We have found that tetrazo-diphenyl and tetrazo-ditolyl do not combine with two molecules of the sodium salt of $beta_1$-naphthylamin-$beta_2$-$beta_3$-disulfo-acid (called "amido R salt) neither in acid nor alkaline solution, and no dyestuff can thus be obtained. It might be presumed that the tetrazo-dichlordiphenyl derived from diorthochlorbenzidin should behave in the same manner, but it forms an exception and combines easily with two molecules amido R salt, yielding a bluish-red tetrazo coloring-matter, which by its brilliancy of shade and fastness to acids is distinguished from all red substantive cotton dyestuffs hitherto known.

In the following example we shall describe how our invention is carried out and brought into practical effect. By "parts" are meant parts by weight. Diazotize the solution of twelve (12) parts of dichlorbenzidin in three hundred (300) parts of water and twenty-five (25) parts of hydrochloric acid of 20° Baumé with seven (7) parts of sodium nitrite dissolved in one hundred (100) parts of water. Then run the liquor, while stirring, into a solution of twenty (20) parts of amido R salt and thirty (30) parts of sodium acetate, dissolved in four thousand (4,000) parts of water, allow to stand for twenty-four (24) hours, heat the mass to about 90° centigrade, (90° C.,) precipitate with salt, press and dry. The dyestuff thus obtained is a brown-red powder easily soluble in cold water with a bluish-red color. Caustic lye or soda does not alter the aqueous solution when added properly diluted, but concentrated they yield a red flocculent precipitate. On adding hydrochloric acid a darker shade results. It gives when dissolved in concentrated sulfuric acid a pure blue solution, from which by the addition of a little water, brown flakes are precipitated, which, by more water, are dissolved with a bluish-red color.

The dyestuff dyes cotton without mordants a bluish red, which is distinguished by its pure brilliant shade and fastness to acids.

Now what we claim, and wish to secure by Letters Patent, is the following:

1. As a new process, the production of a bluish-red tetrazo dye, which consists in the combination of tetrazo-dichlordiphenyl, derived from diorthochlorbenzidin, with two molecules of $beta_1$-naphthylamin-$beta_2$-$beta_3$-disulfo-acid, the so-called "amido R acid," substantially as described.

2. As a new article, the bluish-red tetrazo dyestuff herein described derived from tetrazo-dichlordiphenyl and amido R acid, being a brown-red powder and having the following properties, viz: being easily soluble in cold water with a bluish-red color, its aqueous solution not being altered by the addition of properly-diluted caustic lye or soda but yielding a red flocculent precipitate when the lye or soda is added in a concentrated condition, giving when dissolved in concentrated sulfuric acid a pure blue solution from which by the addition of a little water there are precipitated brown flakes which by more water are dissolved with a bluish-red color, dyeing cotton without mordants a bluish red which is distinguished by its pure brilliant shade and fastness to acids.

In testimony whereof we have signed our names to this specification in the presence of two subscribing witnesses.

CHRISTIAN HEINRICH RUDOLPH.
JULIUS HERBABNY.

Witnesses:
JEAN GRUND,
HERMANN DIEHL.